United States Patent [19]
Hrycin et al.

[11] Patent Number: 5,099,359
[45] Date of Patent: Mar. 24, 1992

[54] COMPOSITE OPTICAL INTERFERENCE FILTER FOR USE IN FILM SCANNER SYSTEM

[75] Inventors: Anna L. Hrycin, Rochester; James R. Milch, Pittsford; Walter S. Piskorowski, Jr., Spencerport, all of N.Y.

[73] Assignee: Eastman Kodak Company, Rochester, N.Y.

[21] Appl. No.: 580,682

[22] Filed: Sep. 11, 1990

[51] Int. Cl.$^5$ .............................. G02B 1/10
[52] U.S. Cl. ........................ 359/587; 359/589; 250/208.1; 250/226; 250/227.2; 358/474; 358/80
[58] Field of Search ............... 350/163, 164, 166, 168; 250/208.1, 226, 227.2, 227.23, 235, 236; 358/474, 80

[56] References Cited

U.S. PATENT DOCUMENTS

| | | |
|---|---|---|
| 3,085,468 | 4/1963 | Henin . |
| 4,709,144 | 11/1987 | Vincent .................. 350/166 |
| 4,826,286 | 5/1989 | Thornton, Jr. ............ 350/166 |
| 4,884,868 | 12/1989 | Böhm ...................... 350/168 |
| 4,899,040 | 2/1990 | Davis et al. .............. 250/216 |
| 5,012,346 | 4/1991 | DeJager et al. .......... 358/54 |
| 5,032,004 | 7/1991 | Steinle .................... 250/226 |

OTHER PUBLICATIONS

Department of Defense; *Military Standarization Handbook—Optical Design*, Section 20, pp. 20-1-20-94, 1962.

*Primary Examiner*—Bruce Y. Arnold
*Assistant Examiner*—J. P. Ryan
*Attorney, Agent, or Firm*—Martin Lukacher

[57] ABSTRACT

A composite optical interference filter is used in a film scanning system having a high speed CCD imager. Multiple, alternating, variable thickness layers of higher and lower index thin film oxides deposited on an optically transmissive substrate constitute the filter and enable the filter to provide color balance, notch rejection, and IR rejection all in the same device. Three such filters in a lamphouse of the film scanning system can be selected to match the system spectral response of the CCD imager and the film thereby providing equal density and color balance of the images on the film.

27 Claims, 4 Drawing Sheets

COMPOSITE OPTICAL INTERFERENCE FILTER FOR USE IN FILM SCANNER SYSTEM

BACKGROUND OF THE INVENTION

1. Field of the Invention

This invention relates to composite optical interference filters and also to image scanner systems incorporating such filters. The invention is especially suitable for a film scanner having a CCD imager in providing filters used in the lamphouse of such a system.

2. Cross Reference to Related Applications

Reference is made to U.S. patent applications: Ser. No. 421,894, entitled "Illumination System for a Film Scanner", filed on Oct. 16, 1989, now U.S. Pat. No. 5,012,346; Ser. No. 421,893, entitled "A Beam Splitter for Color Imaging Apparatus", filed on Oct. 16, 1989, now U.S. Pat. No. 5,002,365; Ser. No. 422,328, entitled "Telecine Scanning Apparatus with Spectrally-Shifted Sensitivities Responsive to Negative or Print Film Dyes," filed on Oct. 16, 1989, now U.S. Pat. No. 5,003,379. All of these applications are assigned to the assignee of the present invention. Reference is also made to the Military Standardization Handbook—Optical Design, sec. 20.4.8.4 (1962).

BACKGROUND

Image scanning is a process of converting an image recorded on a photosensitive sheet, such as photographic film, to an electronic image. Scanning, as such, is commonly employed as a first step in the transmission of an image from one storage medium to another, or in the enhancement or the analysis of the image prior to its transmission.

With a photographic film held in a given plane, an image scanner measures the optical density of the film by illuminating it with light of known intensity and measuring the amount of light transmitted through, or from, the film. One type of such a scanner system is described in U.S. Pat. No. 4,933,779 entitled "Image Scanner Apparatus of the Drum Type Having an Efficient Line-of-Light Illumination System", issued to Milch.

If the scanner is intended only for silver images on photosensitive materials, the wavelength of the light source is not critical; it can be selected to match the sensitivity of the optical detector. However, if dye images (color films) are to be scanned (as is the case in this invention), three carefully chosen spectral profiles are required. A description of the color response characteristics of negative and color print film is disclosed in U.S. Pat. No. 5,003,379, entitled "Telecine Scanning Apparatus with Spectrally-Shifted Sensitivities Responsive to Negative or Print Film Dyes," filed on Oct. 16, 1989 in the names of Moore, Hrycin, and Kurtz and assigned to the same assignee as the present application. A CCD-imager which scans the red, green and blue images simultaneously requires certain characteristics in the illumination system which projects or reflects the image being scanned. The spectral content of the light must be controlled for conversion of the scanned image into electronic image signals which are not subject to spectral distortion. The total scanner spectral response of the system is determined by the spectral content of the light source, spectral transmittance of the film at minimum density, the spectral transmittance of the color separation filters on the CCD (if such color separation filters are used), and the spectral response of the CCD itself.

It has been found that there are two principle reasons making control of the system spectral response necessary, namely color reproduction and total signal level. Photographic media are designed to be viewed or printed by a system with a specific spectral response. Only under illumination having such response do all the colors look correct to an observer. Because the film reader can not be readily designed to mimic this ideal response exactly, correction means have been used to calculate the desired red, green, and blue densities from the measured ones. However, such reader designs are capable of correcting only a limited deviation from ideal response.

It has been found that for best noise performance, it is desirable that the red, green, and blue channels on the CCD all reach a maximum signal level at the lowest film density to be scanned. The integral of the spectral factors, in practice, is far from the same for all channels The simplest solution to this problem is to ignore it. In that case, however, one must accept poor color reproduction and poor signal to noise ratios. Using a scanner system with a fully controllable lamphouse, either additive (3 lamps, each with its own filtration and adjustment electronics) or subtractive (variable filters in front of a single bulb) is a complex and expensive alternative. These solutions are expensive to implement for a CCD film scanner.

Another approach to the problem has been to tailor the overall response of the system with multiple, separate filters, adding additional spectral filters, usually in the lamphouse. Filters that perform this function are typically dichroic, multi-layer optical interference filters that selectively transmit and reflect various wavelength ranges in the optical spectrum. Dichroic filters are used, in taking photographs or in corrective color printing and enlarging, to reflect desired wavelengths of light and to transmit the wavelengths which are required to produce colored pictures having balanced colors. Besides color balances, notch filter capabilities are desirable in film scanner systems. Spectral regions centered around 500 nanometers, between the yellow and magenta film dye peaks, and centered around 600 nanometers, between the magenta and cyan film dye peaks, introduce crosstalk into the measurement of dye densities. Notch filtering removes this crosstalk effect. For the most complete control of exposure and color balance three filters are needed; a red, a green and a blue. Such filters and their uses in such a manner are described in U.S. Pat. No. 3,085,468 entitled "Dichroic Filter Color Balance Systems". However, faculties for the fine tuning of signal strength and color reproduction are then needed in the film printing instruments.

In electronic film scanning systems, on the other hand, concern is more with total system response than the response of individual filters. The fine tuning requirement is met by the electronics used with the film scanner device. Meeting the color reproduction and total signal level requirements for high-quality image scanning, however, still required typically a number of separate spectral filters, usually located in the lamphouse, including a balance filter to adjust the relative amount of red, green and blue light; an infrared rejection filter, and one or more notch filters to decrease the system response at unwanted (between the film dye curves) wavelengths.

SUMMARY OF THE INVENTION

A principal object of the present invention is to provide an improved optical filter and film scanning system incorporating such filter wherein the color balancing, IR rejection, and notch filtering requirements are obtained with a single optical interference filter in place of three or more separate spectral filters.

A further object of the present invention is to provide an improved scanner system with less costly, less complex, and more efficient lamphouse filtration than heretofore available in image scanner systems.

An additional object of the present invention is to provide an improved high speed image scanning system with multiple color balancing, IR rejection and notch filtering capabilities for various positive and negative film types with different spectral transmittance characteristics and system detector spectral response characteristics.

Briefly described, an optical filter having composite color balance, IR rejection, and notch filter characteristics, in accordance with the invention, in a multichroic optical interference filter capable of transmitting a spectral output over upper, intermediate and lower portions of a visible wavelength range which is complimentary to the spectral characteristics of an opto-electronic transducer that provides electrical signals corresponding to light of wavelengths in the visible range which are incident on the transducer, and complimentary to the spectral transmittance characteristics of film types to be scanned, the filter comprising a transparent substrate and a plurality of layers of thicknesses and ordering such that discrete parts of upper (red wavelength band) and intermediate (green wavelength band) spectrum are transmitted and parts between the transmitted upper and intermediate portions and between intermediate and lower (blue wavelength band) transmitted portions are substantially suppressed by interference effects while further portions of the spectrum above said upper part of transmitted spectrum are also substantially suppressed.

A drum type image scanner system embodying the invention projects a diffuse line of light, modulated by a film image, onto a CCD image transducer, the line of light having spectral characteristics complimentary to the spectral response of the transducer to compensate for lack of balance in the spectral response of the transducer and complimentary to the spectral transmittance characteristics of the film being scanned. The system comprises a white light source, an optical interference filter, a lamphouse, means for supporting a film image plane, imaging optics, and CCD transducer means for translating said image into electrical signals including image processing electronics connected to the transducer. The interference filter embodying the invention is disposed between the light source and the lamphouse and provides a spectral output over the above described spectral regions, said regions being complimentary to the spectral characteristics of an opto-electronic transducer that provides electrical signals corresponding to light of wavelengths in the visible range which are incident on the transducer and complimentary to the spectral transmittance characteristics of the film to be scanned.

In accordance with the multi-purpose lamphouse filtration system aspect of the invention, there is provided means for positioning any of several optical interference filters in the lamphouse of the scanner system, interposed between a source of light and a light pipe of the lamphouse such that light incident on the scanned film, after passing through the interference filter, is spectrally matched to the spectral transmittance characteristics of the film and the spectral response characteristics of the opto-electronic detector.

In one embodiment of the present invention, an optical interference filter is disposed in the lamphouse of a drum type image scanner, interposed between the light source and a light pipe leading to a mixing chamber where the light is diffused and allowed to exit as a diffuse, bright line. The interference filter is formed by depositing alternate layers of $TiO_2$ and $SiO_2$ on a planar surface of a glass substrate, the thickness of each layer optimized to a fractional part of an odd multiple of $\lambda/4$ with one or more optimized $\lambda/2$ layers sandwiched in between the optimized $\lambda/4$ layers (for $\lambda=650$ nm) such that a lower, blue portion, an intermediate, green portion, and an upper, red portion of the visible spectrum are transmitted by the filter while a wavelength range between the lower and intermediate transmitted portions and a wavelength range between the intermediate and upper transmitted portions are substantially suppressed by interference effects. Additionally, a wavelength range above the upper transmitted Portion tending towards short wave IR wavelengths is also suppressed. In this manner, one multichroic, multilayer optical interference filter acts as a color balance filter, an IR rejection filter and one or more notch filters. The filter is termed multichroic since multiple colors are transmitted and reflected.

An advantage of the present invention is that the color balance, notch filter, and IR rejection characteristics of the interference filter are matched to the component system spectral response characteristics of the scanner system; i.e. the CCD opto-electronic image transducer and the film type being scanned.

A further advantage of the present invention is that three separate spectral filters corresponding to a color balance, notch, and IR rejection filter, respectively are replaced by a single composite filter spectrally matched to the scanner system spectral response characteristics.

A still further advantage is that a filter holder capable of holding several (three in a preferred embodiment of the invention) composite interferences filters, each spectrally keyed to the spectral response characteristics of the image scanner system, can be disposed in the lamphouse of the scanner in a manner such that light from the source passing through the interference filter is spectrally matched to the spectral transmittance characteristics of the object film type and to the opto-electronic transducer spectral response characteristics. The spectrally filtered light then enters the light pipe wherein it is directed into a mixing chamber and exits the mixing chamber as a diffuse, bright line directly incident on the film to be scanned.

Thus, overall, a high-speed, CCD imager based drum type image scanner system containing a plurality of composite optical interference filters which results in a less costly, less complex and more efficient image scanning system of high quality is provided.

The advantages of this invention as detailed above, as well as other advantages of the present invention will become more apparent in the detailed description of a preferred embodiment presented below.

BRIEF DESCRIPTION OF THE DRAWINGS

The invention will be described with reference to the accompanying drawings, wherein.

DETAILED DESCRIPTION

The optical interference filter of the present invention is fabricated by methods well known in the thin film art. The interference filter described herein is suitable for use in film scanning systems and particularly for use in the lamphouse of such systems. See U.S. Pat. No. 4,933,779, referenced above.

Figure 1:
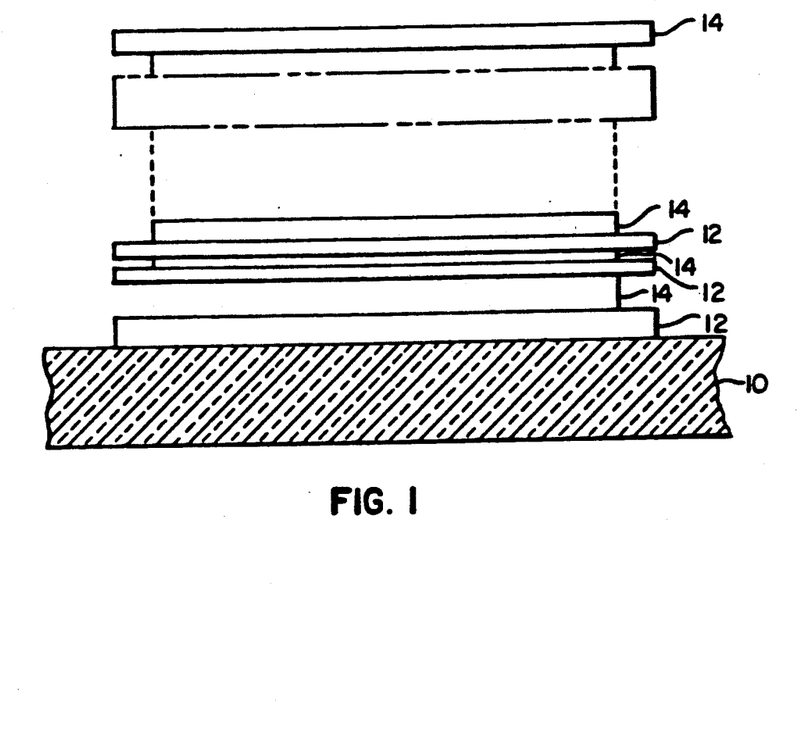
FIG. 1 is a diagramatic view of a multilayer optical interference filter, in accordance with a presently preferred embodiment of the invention, showing alternate layers of high and low index of refraction thin films of varying thicknesses deposited on a filter substrate.

FIG. 1 shows one preferred embodiment of an optical interference filter comprising a glass substrate 10 having an index of refraction equal to 1.52, a planar surface of this substrate having deposited thereon, by well known thin film deposition methods, a first layer 12 of higher index $TiO_2$ (index n having a value $2.2 \leq n \leq 2.3$ at $\lambda = 650$ nm), and upon that a second layer 14 of lower index $SiO_2$ (index n having a value $1.45 \leq n \leq 1.48$ at $\lambda = 650$ nm) whereupon alternating layers of higher index 12 and lower index 14 thin films of $TiO_2$ and $SiO_2$, respectively are deposited until 20 separate layers of the condition and optical thicknesses indicated below, in Table I are achieved.

TABLE I

| | | |
|---|---|---|
| 1st layer $TiO_2$ | 1.081 × $\lambda/4$ for 650 nm |
| 2nd layer $SiO_2$ | 1.015 × $\lambda/4$ for 650 nm |
| 3rd layer $TiO_2$ | 1.123 × $\lambda/4$ for 650 nm |
| 4th layer $SiO_2$ | 1.096 × $\lambda/4$ for 650 nm |
| 5th layer $TiO_2$ | 1.107 × $\lambda/4$ for 650 nm |
| 6th layer $SiO_2$ | 1.015 × $\lambda/2$ for 650 nm |
| 7th layer $TiO_2$ | 1.159 × $\lambda/4$ for 650 nm |
| 8th layer $SiO_2$ | 0.666 × $\lambda/4$ for 650 nm |
| 9th layer $TiO_2$ | 1.004 × $\lambda/4$ for 650 nm |
| 10th layer $SiO_2$ | 0.903 × $\lambda/4$ for 650 nm |
| 11th layer $TiO_2$ | 0.949 × $\lambda/4$ for 650 nm |
| 12th layer $SiO_2$ | 0.993 × $\lambda/4$ for 650 nm |
| 13th layer $TiO_2$ | 1.234 × $\lambda/4$ for 650 nm |
| 14th layer $SiO_2$ | 1.123 × $\lambda/4$ for 650 nm |
| 15th layer $TiO_2$ | 0.944 × $\lambda/4$ for 650 nm |
| 16th layer $SiO_2$ | 1.033 × $\lambda/4$ for 650 nm |
| 17th layer $TiO_2$ | 0.940 × $\lambda/4$ for 650 nm |
| 18th layer $SiO_2$ | 1.105 × $\lambda/4$ for 650 nm |
| 19th layer $TiO_2$ | 1.208 × $\lambda/4$ for 650 nm |
| 20th layer $SiO_2$ | 0.607 × $\lambda/4$ for 650 nm |

The light incident is assumed normal to the filter.

Figure 4:
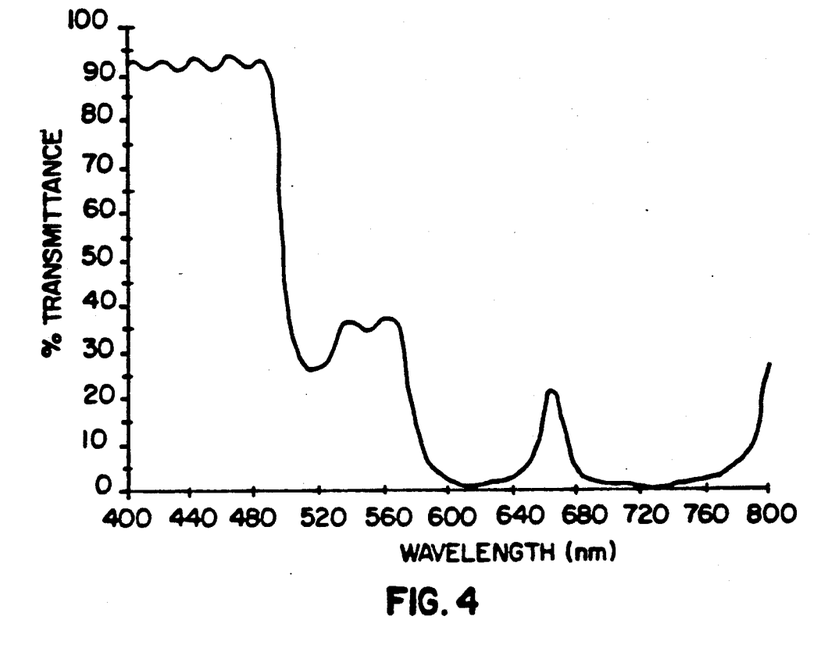
FIGS. 4, 5 and 6 are plots showing percent optical transmittance versus wavelength, in nanometers (nm) for each of three optical interference filters corresponding to three spectral transmittance functions of the different film objects to be scanned.

The optical thicknesses and ordering disclosed above result in a composite interference filter with spectral transmission and rejection characteristics complimentary to the composite spectral response characteristics of a CCD opto-electronic transducer of the type referred to in the aforementioned U.S. Pat. No. 4,933,779 and the spectral transmittance characteristics of negative film types such as Kodak Vericolor III and many other negative film types. All layers in this embodiment are refined (optimized) $\lambda/4$ layers except layer #6 which is an optimized $\lambda/2$ layer. This $\lambda/2$ layer provides notch definition and appropriate red spectrum transmission. FIG. 4 graphically illustrates the lower (blue), intermediate (green), and upper (red) spectral portions transmitted by this filter, the spectral portions between the lower and intermediate transmitted portions and between the intermediate and upper transmitted portions that are substantially suppressed by interference effects, and the portion of the spectrum above the upper (red) transmitted portion also substantially suppressed. This filter is termed an NL filter which designates negative film types, large magnification.

A second embodiment of the interference filter of the present invention, also constructed as shown in FIG. 1, has 20 alternating higher and lower index thin film layers deposited on a glass substrate 10 of index n = 1.52. The layers ordered with respect to the substrate are listed in Table II.

TABLE II

| | | |
|---|---|---|
| 1st layer $TiO_2$ | 1.018 × $\lambda/4$ for 650 nm |
| 2nd layer $SiO_2$ | 1.018 × $\lambda/4$ for 650 nm |
| 3rd layer $TiO_2$ | 1.088 × $\lambda/4$ for 650 nm |
| 4th layer $SiO_2$ | 1.214 × $\lambda/4$ for 650 nm |
| 5th layer $TiO_2$ | 1.123 × $\lambda/4$ for 650 nm |
| 6th layer $SiO_2$ | 1.002 × $\lambda/2$ for 650 nm |
| 7th layer $TiO_2$ | 1.045 × $\lambda/4$ for 650 nm |
| 8th layer $SiO_2$ | 0.801 × $\lambda/4$ for 650 nm |
| 9th layer $TiO_2$ | 0.906 × $\lambda/4$ for 650 nm |
| 10th layer $SiO_2$ | 0.897 × $\lambda/4$ for 650 nm |
| 11th layer $TiO_2$ | 0.926 × $\lambda/4$ for 650 nm |
| 12th layer $SiO_2$ | 1.150 × $\lambda/4$ for 650 nm |
| 13th layer $TiO_2$ | 1.100 × $\lambda/4$ for 650 nm |
| 14th layer $SiO_2$ | 1.165 × $\lambda/4$ for 650 nm |
| 15th layer $TiO_2$ | 0.915 × $\lambda/4$ for 650 nm |
| 16th layer $SiO_2$ | 1.027 × $\lambda/4$ for 650 nm |
| 17th layer $TiO_2$ | 1.033 × $\lambda/4$ for 650 nm |
| 18th layer $SiO_2$ | 1.361 × $\lambda/4$ for 650 nm |
| 19th layer $TiO_2$ | 1.248 × $\lambda/4$ for 650 nm |
| 20th layer $SiO_2$ | 0.725 × $\lambda/4$ for 650 nm |

The light incident is assumed normal to the filter.

The optical thicknesses and ordering disclosed above result in a composite interference filter similar in all functional aspects to the filter having the layers listed in Table I except that the spectral filtering characteristics of the filter are matched to the spectral transmittance characteristics of positive (reversal) film types such as Kodak Ektachrome or Kodachrome instead of negative film types. All layers in this embodiment are refined (optimized) $\lambda/4$ layers except layer #6 which is an optimized $\lambda/2$ layer, providing notch definition and appropriate red spectrum transmission.

Figure 5:
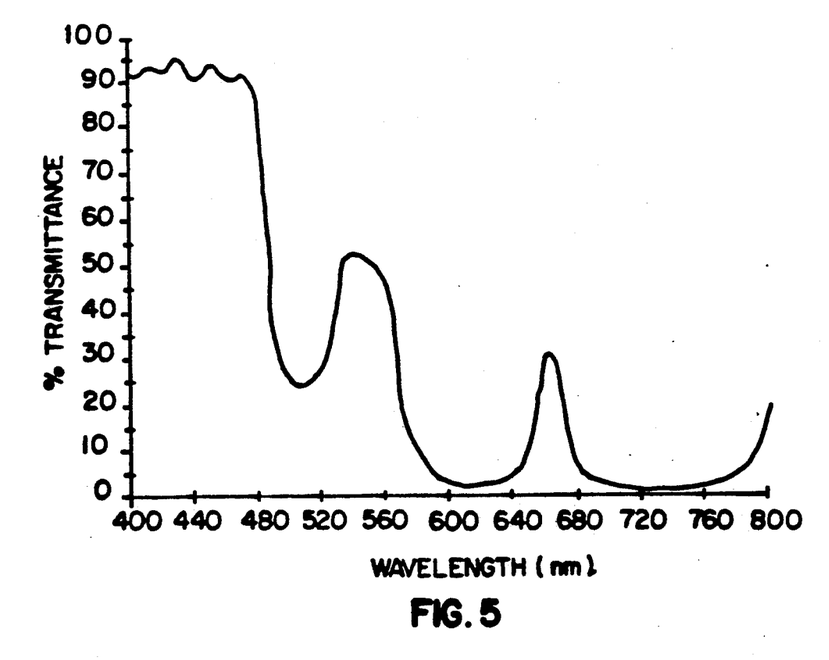

FIG. 5 graphically illustrates the spectral filtering characteristics of this embodiment. This filter is termed an E filter which designates positive (reversal) film types.

A third embodiment of the interference filter of the present invention, also constructed as diagrammed in FIG. 1, has 20 alternating higher and lower index thin film layers deposited on a glass substrate 10 of index n = 1.52. The layers ordered with respect to the substrate are listed in Table III.

TABLE III

| | | |
|---|---|---|
| 1st layer $TiO_2$ | 1.261 × $\lambda/4$ for 650 nm |
| 2nd layer $SiO_2$ | 1.221 × $\lambda/4$ for 650 nm |
| 3rd layer $TiO_2$ | 0.969 × $\lambda/4$ for 650 nm |

TABLE III-continued

| | | |
|---|---|---|
| 4th layer SiO$_2$ | 1.005 × λ/4 for 650 nm |
| 5th layer TiO$_2$ | 1.131 × λ/4 for 650 nm |
| 6th layer SiO$_2$ | 0.929 × λ/2 for 650 nm |
| 7th layer TiO$_2$ | 1.233 × λ/4 for 650 nm |
| 8th layer SiO$_2$ | 0.764 × λ/4 for 650 nm |
| 9th layer TiO$_2$ | 1.127 × λ/4 for 650 nm |
| 10th layer SiO$_2$ | 1.017 × λ/4 for 650 nm |
| 11th layer TiO$_2$ | 1.155 × λ/4 for 650 nm |
| 12th layer SiO$_2$ | 1.043 × λ/4 for 650 nm |
| 13th layer TiO$_2$ | 1.041 × λ/4 for 650 nm |
| 14th layer SiO$_2$ | 1.015 × λ/4 for 650 nm |
| 15th layer TiO$_2$ | 1.009 × λ/4 for 650 nm |
| 16th layer SiO$_2$ | 1.195 × λ/4 for 650 nm |
| 17th layer TiO$_2$ | 1.181 × λ/4 for 650 nm |
| 18th layer SiO$_2$ | 1.302 × λ/4 for 650 nm |
| 19th layer TiO$_2$ | 1.365 × λ/4 for 650 nm |
| 20nd layer SiO$_2$ | 0.739 × λ/4 for 650 nm |

The light incident is assumed normal to the filter.

The optical thicknesses and ordering disclosed above result in a composite interference filter similar in all functional aspects to the filters having the layers listed in Tables I and II, except that the spectral filtering characteristics of the filter are matched to the spectral transmittance characteristics of negative film types such as Kodak Vericolor III and many other negative film types instead of positive film types as in example 2.

Figure 6:
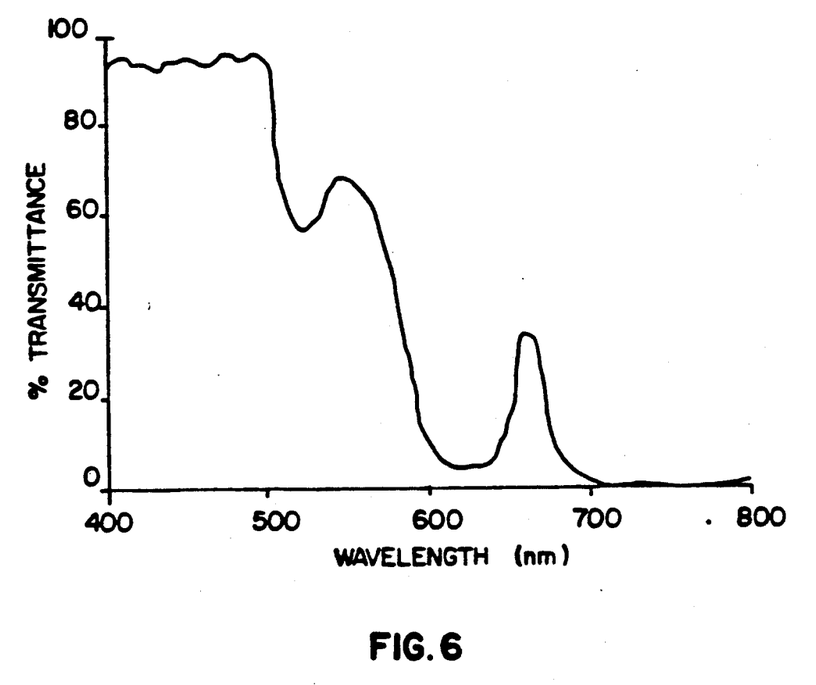

FIG. 6 graphically illustrates the spectral filtering characteristics of this embodiment. This filter is termed an NS filter which designates negative film types, small magnification. This provides spectral response similar to the NL filter but with a different overall energy balance.

In another embodiment of the interference filter of the present invention the substrate material may be any common substrate material known in the thin film art that is capable of transmitting wavelengths over the visible spectrum, while significantly absorbing in the UV spectrum, including other glass types.

Also in other embodiments of the interference filter of the present invention thin film material layers other than TiO$_2$ and SiO$_2$ are suitable. The range of index values and the contrast in index values between the lower and higher index thin film materials determine the selection of thin film materials. Further dependence results from the refractive index of the substrate material and other particular design parameters well known in the thin film art. Other examples of refractory materials suitable for use in providing the thin film layers of filters embodying the invention include, but are not limited to cryolite, chiolite, magnesium fluoride, thorium fluoride, cerium fluoride, zirconium dioxide, zinc sulfide, cerium dioxide, tantalum oxide and hafnium oxide.

Figure 2:
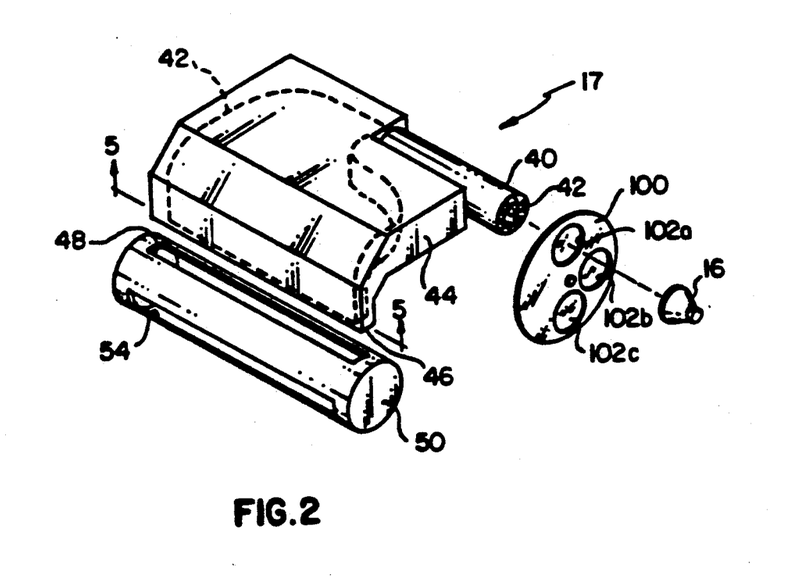
FIG. 2 is a perspective, partially exploded view of the lamphouse including the filter holder with three filters; the light source, and the mixing chamber from which a diffuse line of light exits.

Referring to FIG. 2, there is illustrated a lamphouse 17 of a preferred embodiment of a linear film scanning system. A filter holder (wheel) 100 holds optical interference filters 102a, b, and c interposed between a light source 16 and light pipe 40, provided by a bundle of optical fibers. Each filter may be in accordance with a different embodiment; i.e. filter 102(a) (Table I), filter 102(b) (Table II) or filter 102(c) (Table III). White light from lamp 16 passes through the one of the interference filters 102 in alignment with the light pipe 40 due to the angular position of the holder 100. Spectrally filtered light is then incident on the bundle of optical fibers 42 comprising light pipe 40. The fiber bundle 42 is unbundled inside a housing 44. The optical fibers are arranged with their respective output ends distributed along a nose 46 of the housing 44 which faces downwardly and is disposed within an elongate rectangular entrance slot 48 of a cylindrical mixing chamber 50. Thus, light from the lamp 16 is spread out and thereby enters the mixing chamber 50 through the slot 48 which extends longitudinally from one end of the tube to the next.

Figure 3:
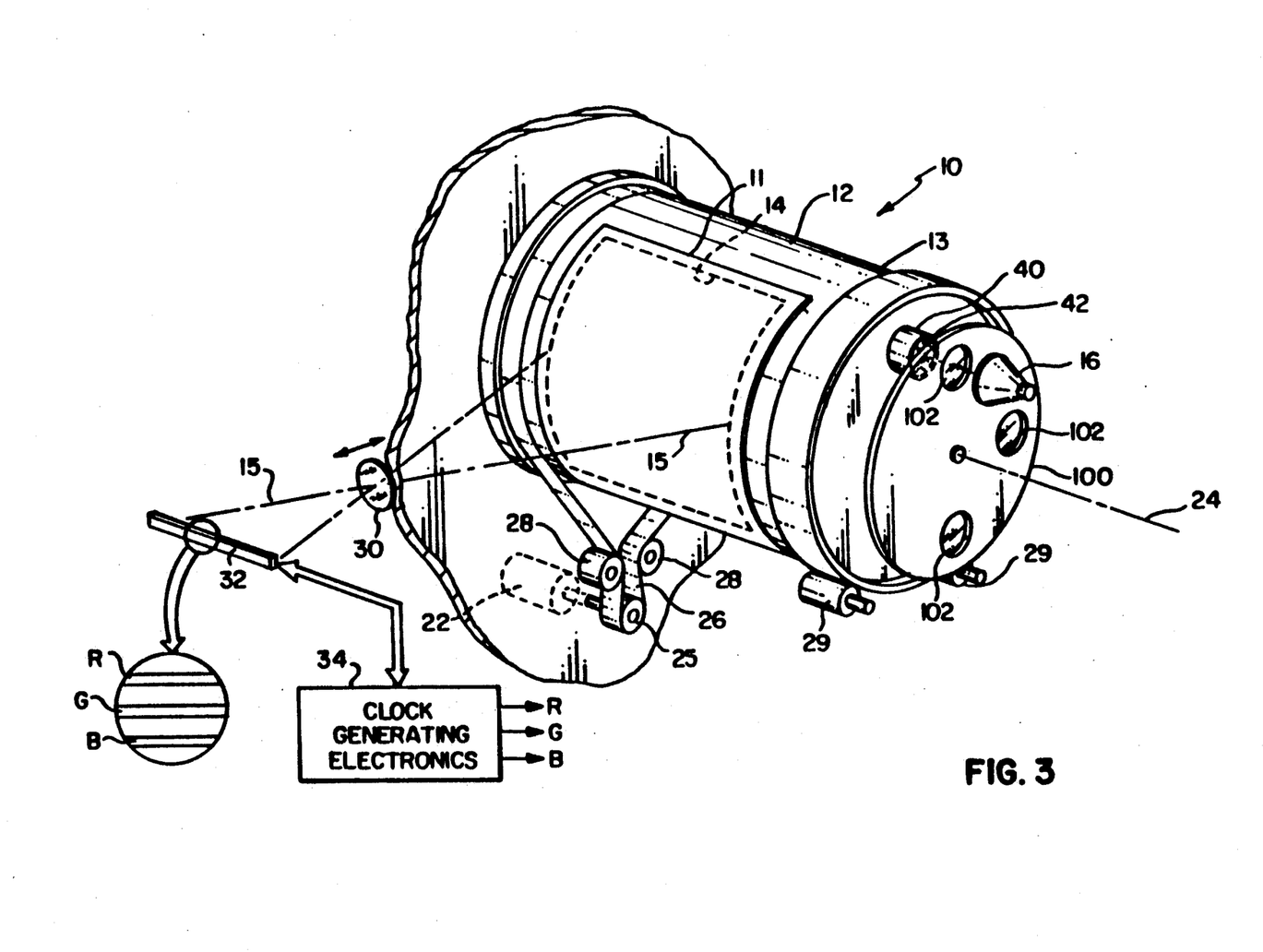
FIG. 3 is a perspective view of an image scanner system of the drum type in accordance with the present invention.

The chamber 50 serves a dual function of diffusing light received and projecting a relatively thin line of such diffuse illumination onto the film image plane of the scanner system 10 which is shown in FIG. 3. The lamphouse 17 of FIG. 2 and drum type image scanner system 10 of FIG. 3 of the type disclosed herein are also described in U.S. Pat. No. 4,933,779, cited above, to which reference may be made for further details thereof.

As shown in FIG. 3, the holder 100 containing the interference filters 102, is disposed in the lamphouse 17 of the image scanner system 10 and is rotated to a position such that light from lamp 16 passes through one of the interference filters 102 having spectral filtering characteristics matched to the spectral transmittance characteristics of the particular film type being scanned.

The invention has been described in detail with reference to the figures; however, it will be appreciated that variations and modifications are possible within the spirit and scope of the invention. For example, a lower index of refraction thin film layer may be deposited as the first layer next to the substrate; thin film layers can be deposited on substrates having positive or negative optical power.

We claim:

1. A multichroic optical interference filter which provides a spectral output over upper, intermediate, and lower portions of a visible wavelength range over which an opto-electronic transducer is operative to provide electrical signals corresponding to light of wavelengths in the visible range which are incident on the transducer, said transducer being responsive to light over the visible range in accordance with a spectral response characteristic to illumination from film scanned in a film scanning system which has a spectral transmission characteristic, said spectral output of said filter being complementary to the spectral transmittance characteristics of the film and to the spectral response characteristic of said transducer, said filter comprising a transparent substrate and a plurality of layers of thickness and ordering such that discrete first parts of upper (red), intermediate (green), and lower (blue) portions of the visible spectrum are transmitted, at least one of said first parts extending over a wavelength range which exceeds 50 nm, and second parts between said transmitted upper and intermediate portions and between said transmitted intermediate and lower portions which are substantially suppressed by interference effects while the portion above the transmitted upper first part of the spectrum is also substantially suppressed.

2. The filter according to claim 1 further comprising a filter wherein said second parts are in regions of the spectrum where the spectral response of said film with primary colors overlap whereby to reduce spectral crosstalk in color images formed on said films.

3. The filter according to claim 1 wherein said second parts are in spectral bands or notch regions centered about 500 nanometers and centered about 600 nanometers.

4. The filter according to claim 3 wherein said film have primary dye materials which produce said primary colors and said second parts are in regions where the spectral response of said primary dyes overlap, whereby spectral crosstalk between said primary dye materials is substantially suppressed.

5. The optical interference filter claimed in claim 1 wherein upper, intermediate, and lower first parts are transmitted with successively decreasing transmittance.

6. The optical interference filter claimed in claim 1 wherein the upper portion has a range from about 380 to about 490 nanometers, the intermediate portion from about 525 to about 570 nanometers, and the lower portion from about 640 to about 680 nanometers.

7. The optical interference filter claimed in claim 6 wherein transmittance of upper, intermediate, and lower parts have relative peak transmittance values of about 96%, 67%, and 33%.

8. The optical interference filter claimed in claim 1 wherein the upper portion has a range from about 380 to about 480 nanometers, the intermediate portion from about 525 to about 570 nanometers, and the lower portion from about 640 to about 680 nanometers.

9. The optical interference filter claimed in claim 8 wherein transmittance of upper, intermediate, and lower parts have relative peak transmittance values of about 95%, 55%, and 30%.

10. The optical interference filter claimed in claim 1 wherein the upper portion has a range from about 380 to about 490 nanometers, the intermediate portion from about 530 to about 570 nanometers, and the lower portion from about 650 to about 675 nanometers.

11. The optical interference filter claimed in claim 10 wherein transmittance of upper, intermediate, and lower parts have relative peak transmittance values of about 94%, 37%, and 23%.

12. The optical interference filter claimed in claim 1 wherein the optically transmissive substrate is an optical material transparent to light over the visible spectrum.

13. The optical interference filter claimed in claim 1 wherein the optically transmissive substrate comprises glass with an index of refraction equal to 1.52.

14. The optical interference filter claimed in claim 1 wherein the optically transmissive surfaces of said substrate are planar.

15. The optical interference filter claimed in claim 1 wherein the optically transmissive surfaces of the substrate have positive or negative curvatures.

16. The optical interference filter claimed in claim 1 wherein the plurality of layers are thin films of materials comprising a group whose indices of refraction range from a lower value of about 1.35 to a higher value of about 2.90.

17. The optical interference filter claimed in claim 1 wherein the ordering of thin film layers successively alternates between a higher index thin film layer and a lower index thin film layer.

18. The optical interference filter claimed in claim 1 wherein the thicknesses of the layers are optimized one quarter wavelength layers for a design wavelength, $\lambda$, of 650 nm, refined to transmit balanced portions of the upper, intermediate, and lower visible spectra, and to substantially suppress by interference effects portions of the spectrum between the transmitted portions and above the upper part of spectrum, one or more nominal one-half wavelength layers being sandwiched between the nominal one-quarter wavelength layers providing for notch suppression and appropriate red spectrum transmission.

19. The optical interference filter claimed in claim 1 wherein the plurality of layers comprises between nine to thirteen pairs of alternating higher and lower index thin film layers.

20. The optical interference filter claimed in claim 1 comprising alternate thin film layers of $TiO_2$ and $SiO_2$.

21. The interference filter claimed in claim 1 having said plurality of layers in the order counting upward from said substrate and having the thickness as set forth in the following Table:

| | |
|---|---|
| 1st layer $TiO_2$ | $1.081 \times \lambda/4$ for 650 nm |
| 2nd layer $SiO_2$ | $1.015 \times \lambda/4$ for 650 nm |
| 3rd layer $TiO_2$ | $1.123 \times \lambda/4$ for 650 nm |
| 4th layer $SiO_2$ | $1.096 \times \lambda/4$ for 650 nm |
| 5th layer $TiO_2$ | $1.107 \times \lambda/4$ for 650 nm |
| 6th layer $SiO_2$ | $1.015 \times \lambda/2$ for 650 nm |
| 7th layer $TiO_2$ | $1.159 \times \lambda/4$ for 650 nm |
| 8th layer $SiO_2$ | $0.666 \times \lambda/4$ for 650 nm |
| 9th layer $TiO_2$ | $1.004 \times \lambda/4$ for 650 nm |
| 10th layer $SiO_2$ | $0.903 \times \lambda/4$ for 650 nm |
| 11th layer $TiO_2$ | $0.949 \times \lambda/4$ for 650 nm |
| 12th layer $SiO_2$ | $0.993 \times \lambda/4$ for 650 nm |
| 13th layer $TiO_2$ | $1.234 \times \lambda/4$ for 650 nm |
| 14th layer $SiO_2$ | $1.123 \times \lambda/4$ for 650 nm |
| 15th layer $TiO_2$ | $0.944 \times \lambda/4$ for 650 nm |
| 16th layer $SiO_2$ | $1.033 \times \lambda/4$ for 650 nm |
| 17th layer $TiO_2$ | $0.940 \times \lambda/4$ for 650 nm |
| 18th layer $SiO_2$ | $1.105 \times \lambda/4$ for 650 nm |
| 19th layer $TiO_2$ | $1.208 \times \lambda/4$ for 650 nm |
| 20th layer $SiO_2$ | $0.607 \times \lambda/4$ for 650 nm. |

22. The interference filter claimed in claim 1 having said plurality of layers in the order counting upward from said substrate and having the thicknesses as set forth in the following Table:

| | |
|---|---|
| 1st layer $TiO_2$ | $1.018 \times \lambda/4$ for 650 nm |
| 2nd layer $SiO_2$ | $1.018 \times \lambda/4$ for 650 nm |
| 3rd layer $TiO_2$ | $1.088 \times \lambda/4$ for 650 nm |
| 4th layer $SiO_2$ | $1.214 \times \lambda/4$ for 650 nm |
| 5th layer $TiO_2$ | $1.123 \times \lambda/4$ for 650 nm |
| 6th layer $SiO_2$ | $1.002 \times \lambda/2$ for 650 nm |
| 7th layer $TiO_2$ | $1.045 \times \lambda/4$ for 650 nm |
| 8th layer $SiO_2$ | $0.801 \times \lambda/4$ for 650 nm |
| 9th layer $TiO_2$ | $0.906 \times \lambda/4$ for 650 nm |
| 10th layer $SiO_2$ | $0.897 \times \lambda/4$ for 650 nm |
| 11th layer $TiO_2$ | $0.926 \times \lambda/4$ for 650 nm |
| 12th layer $SiO_2$ | $1.150 \times \lambda/4$ for 650 nm |
| 13th layer $TiO_2$ | $1.100 \times \lambda/4$ for 650 nm |
| 14th layer $SiO_2$ | $1.165 \times \lambda/4$ for 650 nm |
| 15th layer $TiO_2$ | $0.915 \times \lambda/4$ for 650 nm |
| 16th layer $SiO_2$ | $1.027 \times \lambda/4$ for 650 nm |
| 17th layer $TiO_2$ | $1.033 \times \lambda/4$ for 650 nm |
| 18th layer $SiO_2$ | $1.361 \times \lambda/4$ for 650 nm |
| 19th layer $TiO_2$ | $1.248 \times \lambda/4$ for 650 nm |
| 20th layer $SiO_2$ | $0.725 \times \lambda/4$ for 650 nm. |

23. The interference filter claimed in claim 1 having said plurality of layers in the order counting upward from said substrate and having the thicknesses as set forth in the following Table:

| | |
|---|---|
| 1st layer $TiO_2$ | $1.261 \times \lambda/4$ for 650 nm |
| 2nd layer $SiO_2$ | $1.221 \times \lambda/4$ for 650 nm |
| 3rd layer $TiO_2$ | $0.969 \times \lambda/4$ for 650 nm |
| 4th layer $SiO_2$ | $1.005 \times \lambda/4$ for 650 nm |
| 5th layer $TiO_2$ | $1.131 \times \lambda/4$ for 650 nm |
| 6th layer $SiO_2$ | $0.929 \times \lambda/2$ for 650 nm |
| 7th layer $TiO_2$ | $1.233 \times \lambda/4$ for 650 nm |
| 8th layer $SiO_2$ | $0.764 \times \lambda/4$ for 650 nm |
| 9th layer $TiO_2$ | $1.127 \times \lambda/4$ for 650 nm |
| 10th layer $SiO_2$ | $1.017 \times \lambda/4$ for 650 nm |
| 11th layer $TiO_2$ | $1.155 \times \lambda/4$ for 650 nm |
| 12th layer $SiO_2$ | $1.043 \times \lambda/4$ for 650 nm |
| 13th layer $TiO_2$ | $1.041 \times \lambda/4$ for 650 nm |
| 14th layer $SiO_2$ | $1.015 \times \lambda/4$ for 650 nm |

-continued

| | | |
|---|---|---|
| 15th layer TiO$_2$ | 1.009 × λ/4 for 650 nm |
| 16th layer SiO$_2$ | 1.195 × λ/4 for 650 nm |
| 17th layer TiO$_2$ | 1.181 × λ/4 for 650 nm |
| 18th layer SiO$_2$ | 1.302 × λ/4 for 650 nm |
| 19st layer TiO$_2$ | 1.365 × λ/4 for 650 nm |
| 20nd layer SiO$_2$ | 0.739 × λ/4 for 650 nm. |

24. A drum type image scanner system for projecting a diffuse line of light, modulated by a film image, onto a CCD image transducer, said line of light having spectral characteristics complimentary to the spectral response of said transducer to compensate for lack of balance in the spectral response of said transducer and complimentary to the spectral transmittance characteristics of the film type being scanned, the system comprising a white light source, an optical interference filter, a lamphouse, means for supporting a film image plane, imaging optics, and CCD transducer means for translating said image into electrical signals including image processing electronics connected to the transducer; the interference filter being disposed in the lamphouse, said filter providing a spectral output over upper, intermediate, and lower portions of the visible wavelength range which is complimentary to the spectral characteristics of an opto-electronic transducer that provides electrical signals corresponding to light of wavelengths in the visible range which are incident on the transducer, the filter further comprising a transparent substrate and a plurality of layers of thicknesses and ordering such that discrete parts of the upper, intermediate, and lower portions of the light spectrum are transmitted at least one of which over a range of at least 50 nm and parts of the spectrum between the transmitted upper and intermediate portions and between transmitted intermediate and lower portions are substantially suppressed by interference effects while the portion above the upper transmitted part of the spectrum is also substantially suppressed.

25. The image scanner system claimed in claim 24 wherein the lamphouse comprises a light pipe and a mixing chamber to diffuse the light, said lamphouse being disposed such that light from the source, passing through the interference filter, enters the light pipe and is directed into the mixing chamber, wherein the light is mixed and exits said mixing chamber as a bright, diffuse line of light.

26. The image scanner system claimed in claim 24 wherein the lamphouse comprises a holder which provides means to hold a plurality of optical interference filters, said holder further providing means to interpose any one of the plurality of interference filters between the light source and the lamphouse so that spectral transmittance characteristics of the filter and spectral response characteristics of a film being held for scanning are matched.

27. The image scanner system claimed in claim 26 comprising a holder holding three optical interference filters.

* * * * *